United States Patent [19]

Topor et al.

[11] 4,290,989
[45] Sep. 22, 1981

[54] METHOD AND APPARATUS FOR EXTRUDING A PLURALITY OF RIBBONS

[75] Inventors: Michael G. Topor, Farmer's Branch; Peter A. Wicklund; John T. Ivers, both of Lewisville, all of Tex.

[73] Assignee: Frito-Lay, Inc., Dallas, Tex.

[21] Appl. No.: 101,701

[22] Filed: Dec. 10, 1979

[51] Int. Cl.³ .................... B29F 3/06; A21C 11/16
[52] U.S. Cl. ......................... 264/142; 264/40.7;
  264/177 F; 264/177 R; 425/192 R; 425/308;
  425/376 A; 425/464; 425/466; 425/467
[58] Field of Search ............ 264/177 R, 177 F, 40.7,
  264/142; 425/463, 464, 466, 467, 376 R, 376 A,
  192 S, 192 R, 380, 382.2, 381, 308

[56] References Cited

U.S. PATENT DOCUMENTS

| | | | |
|---|---|---|---|
| 2,155,338 | 4/1939 | Stokes | 425/464 |
| 2,738,549 | 3/1956 | Pazitney, Jr. et al. | 425/466 |
| 2,923,970 | 2/1960 | Genovese | 425/464 |
| 3,273,200 | 9/1966 | Shrensel | 425/463 |
| 3,346,916 | 10/1967 | Elbert et al. | 425/464 |
| 3,478,389 | 11/1969 | Bradley et al. | 425/464 |
| 3,585,685 | 6/1971 | McDermott | 425/192 S |

FOREIGN PATENT DOCUMENTS

503731 3/1976 U.S.S.R. ................................. 425/466

*Primary Examiner*—Jeffery R. Thurlow
*Attorney, Agent, or Firm*—Bernard, Rothwell & Brown

[57] ABSTRACT

There is disclosed an apparatus and method for simultaneously forming a flow of extruded material, especially dough, into a plurality of downwardly extending ribbons each at a substantially uniform flow rate and for controlling the tendency of such ribbons to curve as they emanate from the die. The apparatus is an extrusion device which includes a housing adapted for attachment at the exit of the extruder barrel and includes an inlet passage for directing the flow of extrudant downwardly and an outwardly flared section in fluid communication with and downstream of the inlet passage. A die plate is supported by the housing downstream of the inlet and across the flared section and includes a plurality of dies having orifices for forming the extrudant into a plurality of ribbons. A generally cone-shaped mandrel is supported within the flared section of the housing in spaced apart relationship from the die plate surface and the flared section wall defining an annular flow channel for the extrudant. The method of the present invention forms a substantially cylindrical flow of extrudant under pressure into a cone-shaped envelope and vents the flow to a low pressure area through a plurality of orifices to form the desired ribbons. The thicknesses of the wall and the base of the cone-shaped flow envelope can be adjusted to maintain a uniform flow rate and to control the flow direction of the ribbons as they are extruded. The mandrel has a base radius which overlaps the outer periphery of the orifices. The orientation of the mandrel within the flared section can be adjusted to facilitate maintaining substantially equal flow rates of extrudant through the die orifices and to permit control within predetermined limits of the tendency of the ribbons to curve away from an essentially vertical path.

17 Claims, 6 Drawing Figures

U.S. Patent  Sep. 22, 1981  4,290,989
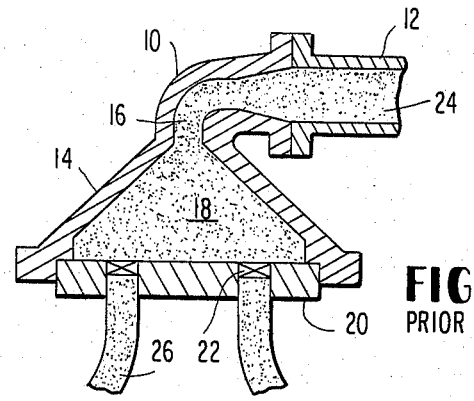
FIG.1 PRIOR ART
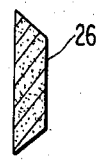
FIG.1a PRIOR ART
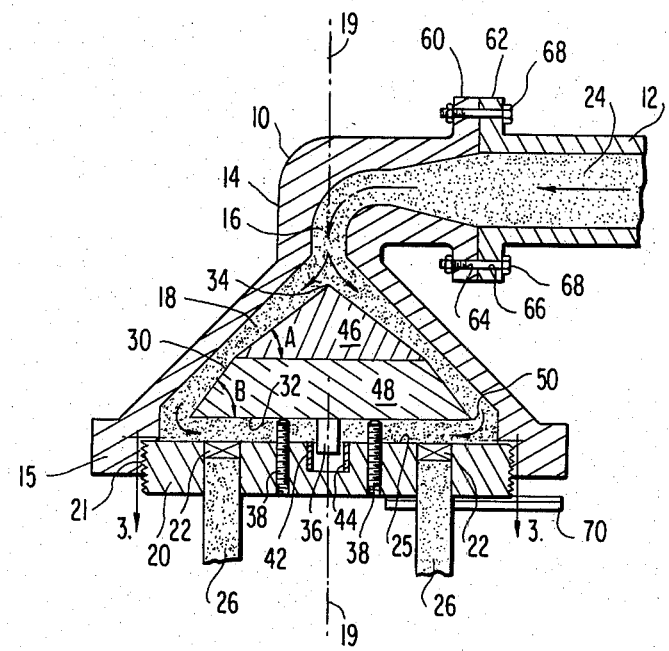
FIG.2
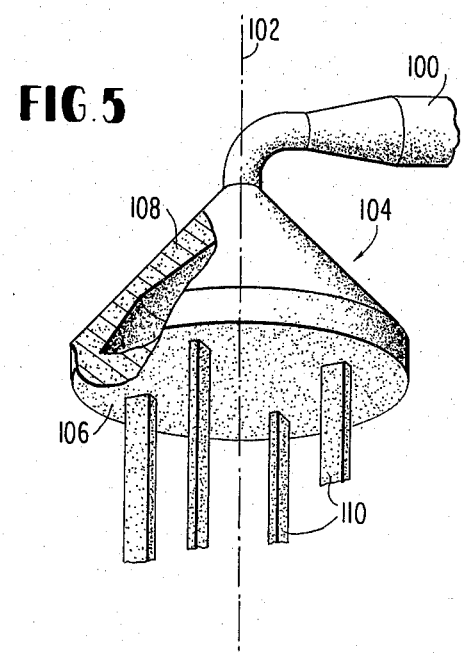
FIG.4
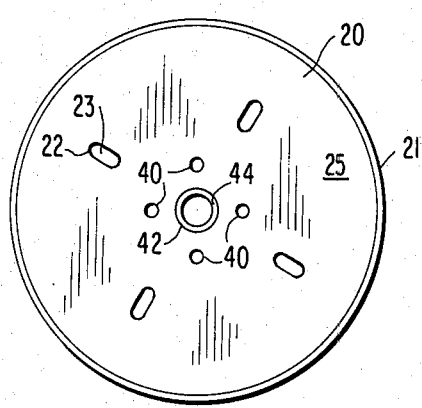
FIG.5
FIG.3

METHOD AND APPARATUS FOR EXTRUDING A PLURALITY OF RIBBONS

The present invention relates to an extrusion device and a method for forming extruded ribbons, and, more particularly, for simultaneously forming a plurality of downwardly extending ribbons each at a substantially uniform flow rate and controlling the flow direction of the ribbons as they are extruded to maintain ribbon flow in an essentially vertical position.

In the past, extruders have been used to convert a single flow of extrudant into a plurality of ribbons. After the ribbons emanate from the die attachment, they may be cut to provide individual pieces which in the case of edible doughs can be cooked to form food products.

It has been considered useful to use a die that simultaneously produces a plurality of downwardly extending ribbons which will hang down under the influence of gravity ready for cutting. An example of such a prior art device is shown in FIG. 1, which is adapted for attachment to the exit end of extruder barrel 12. Device 10 includes a die housing 14 including an inlet passage 16 for directing the extrudant flow 24 downwardly and a flared section 18 in fluid communication with and downstream of inlet passage 16. A die plate 20 is supported by housing 14 across flared section 18 and includes a number of dies 22 having orifices 23 for forming extrudant flow 24 into ribbons 26.

These devices of the prior art tend to produce ribbons which curve outwardly as shown in FIG. 1. One of the contributing factors to this curvature is thought to be that the extrudant flow down the center of flared section 18 is faster than the extrudant flow along the wall of flared section 18 so that more extrudant is accumulated near the center of die plate 20 and more material is available to pass through the portion of the die orifices 23 close to the center. When the ribbon is cut, the individual pieces will also have a generally trapezoidal shape. This trapezoidal shape of the cut dough pieces may, in some instances, be undesirable. It is advantageous to have control over the cross-sectional area shape of these ribbons so that trapezoidal configurations could be achieved if desired, but that a more preferred, rectangular cross-section could be maintained when that result is desired, i.e. by having the ribbons flow essentially vertically downward a distance at least equal to the length of the individually cut pieces of ribbon. Furthermore, because the surface area of die plate 20 is large, there are apt to be eddy flows or other uneven extrudant flow across the upper surface of die plate 20 which can have the effect of delivering non-uniform amounts of extrudant to the individual die orifices 23. This can cause quality control problems.

The present invention provides an apparatus which permits the control of the extrudant flow to facilitate uniform flow rate for each ribbon and permits the control of the extent of the curvature of the extruded ribbon and, when desired, its avoidance. Thus, when ribbon flow is essentially in the vertical direction, the flow rate is substantially equal throughout the cross-sectional area of the ribbon. The invention employs a housing and die plate similar to that of the prior art devices. A generally cone-shaped mandrel is supported within the flared section of the housing with the upper end of the mandrel directed into the extrudant flow and the base of the cone being adjacent but spaced-apart from the inside surface of the die plate. The conic surface of the mandrel is spaced-apart from the wall of the flared section to define an outwardly flared annular flow channel for the extrudant. The base of the cone-shaped mandrel extends at least to the approximate outer edges of the die orifices. The extrudant flow enters the inlet passage and is directed in a downward direction into the flared section. The extrudant flow then encounters the mandrel and is shaped into a shell or envelope configuration as it flows into the annular channel between the mandrel and the wall of the flared section, and then turns inward around the base of the mandrel into the space between the die plate surface and the base of the mandrel and out through the die orifices to simultaneously form a plurality of ribbons.

The orientation of the mandrel in the flared section may be adjusted so as to vary the amount of flow delivered to each die orifice and to control the curvature of the ribbons. This control may take the form of adjusting the axial space between the base of the mandrel and the surface of the die plate or by maintaining the surfaces substantially parallel or by placing these two surfaces in non-parallel orientation so as to cock the mandrel in the flared section.

The shape of the mandrel is generally cone-shaped but it may be divided into an upper section and a lower base section. Also, the upper section may have a smaller base angle than the lower section so that the confronting surfaces of the mandrel and the flared section form a converging-diverging annular passage for the extrudant in the direction of flow.

According to the method of the present invention a generally cylindrical flow of extrudant under pressure is directed along an axis in a downward direction and formed into a cone shaped envelope having a thin wall configuration. The flow is then discharged to a low pressure area through a plurality of orifices oriented adjacent the base of the flow envelope cone to form the desired dough ribbons. The thickness of the walls and base of the flow envelope cone may be adjusted to maintain a substantially uniform flow rate and controlled curvature for each ribbon.

The present invention will be described further with reference to the accompanying drawings in which:

FIG. 1 is a sectional view of an extrusion die of the prior art and the passage of the extrudant flow through the die;

FIG. 1a is a cross-sectional view of the dough ribbon produced by the apparatus of the prior art;

FIG. 2 is a sectional view of the extrusion device of the present invention;

FIG. 3 is a plan view of a die plate of the present invention taken along line 3—3 in FIG. 2;

FIGS. 4 (a) and (b) are alternative die orifice configurations which can be used in the present invention; and, FIG. 5 is a perspective view, partially in section, of the flow of an extrudant produced by the method of the present invention.

The extrusion device of the present invention is well shown in FIG. 2. The device 10 is attached by conventional means as will be subsequently described to the exit end of extruder barrel 12. Member 10 includes a die housing 14 which defines an inlet passage 16 and a flared section 18 in fluid communication with inlet passage 16. Section 18 flares outwardly in the direction of flow. Inlet passage 16 and flared section 18 are arranged generally symmetrically about vertically extending axis 19. A die plate 20 is attached by conventional means as will be subsequently described to die housing 14 and extends across flared section 18 substantially perpendicular to axis 19. Die plate 20 supports a plurality of dies 22 having orifices 23.

A generally cone shaped mandrel 30 is supported in flared section 18 of die housing 14 with its base 32 facing toward die plate 20 and its upper portion 34 directed toward inlet passage 16. The passages in the dies extend at least to a substantial extent in the generally radial direction of the die plate and the periphery of the outer edge of the lower portion of the mandrel overlaps in the vertical direction most, if not essentially all, of the open area of the die passages.

It can be seen that extrudant 24 may flow from extruder barrel 12 into inlet section 16. As it enters flared section 18 it encounters the upper portion or tip 34 of mandrel 30 and flows around the lower edge of mandrel 30 into the space provided between mandrel base 32 and die plate 20. The extrudant flow 24 then passes through die orifices 23 and is formed into ribbons 26.

Referring now to FIGS. 2 and 3, the means for supporting mandrel 30 within flare section 18 of housing 14 can be seen. Stem 36 extends axially from the center of base 32 of mandrel 30. Base 32 has a relatively flat and a relatively hard surface so that it may be accurately oriented with respect to the interior surface 25 of die plate 20 by means of four leveling screws 38 which extend through four axially aligned holes 40 spaced equiangularly at a fixed radius about the center of die plate 20. Holes 20 are tapped with suitable threads to accept leveling screws 38 which are preferably allen screws. The interior surface 25 of die plate 20 has a hole 42 in which is supported a bushing 44 which accepts stem 36. Stem 36 and bushing 44 cooperate to maintain mandrel 30 aligned axially with vertical axis 19. Other suitable means for adjusting the orientation of base 32 with respect to the interior surface 25 of die plate 22 may be used. It is advantageous that the leveling device permits both the angle between base 32 and die plate 20 to be adjusted and at the same time permits the axial or vertical distance between base 32 and die plate 20 to be adjusted so that the orientation of mandrel 30 within flared section 18 may be controlled.

Mandrel 30 is generally cone-shaped. In the preferred embodiment mandrel 30 is divided into a tip portion 46 and a base portion 48. Tip portion 46 is a conic section having a base angle A. Base section 48 is a truncated cone section having a base angle B which is greater than base angle A of tip section 46. Mandrel 30 is positioned in flared section 18 of housing 14 so that the confronting conic surfaces of mandrel 30 and the wall of flared section 18 form an annular passage for extrudant flow 24 which converges and then diverges in the direction of flow.

The diameter of base 32 of mandrel 30 is large enough so that all of the die orifices 23 of die plate 20 are inside the vertical projection of base 32 onto die plate 20, that is, edge 50 of base 32 overlaps the outward radial extension of all die orifices 23. Thus, extrudant flow 24 turns inward around edge 50 of base 32 into the space provided between base 32 and die plate 20 before exiting through die orifices 23.

The problems associated with the device of the prior art shown in FIG. 1 is substantially alleviated by the apparatus of the present invention. The extrudant does not flow at an appreciably greater speed through the central portion of flared section 18 of the device of FIG. 1 than it does along the wall of flared section 18 of the apparatus of the present invention. We have found that positioning mandrel 30 in flared section 18 of die housing 14 tends to alleviate this problem of uneven flow of extrudant from the die orifices 23 and the curling of the ribbons 26 as they exit from the extruder head.

Extrusion device 10 may be attached to extruder barrel 12 by conventional means for example, radially extending flange 60 may be provided about the inlet end of member 10 of mating configuration with a similar radially extending flange 62 about the exit end of extruder barrel 12. Each of flanges 60 and 62 may be provided with aligned bolt holes 64 and 66 for accepting bolts 68 by means of which die attachment 10 may be securely affixed to extruder barrel 12. Suitable sealing gaskets may be provided to prevent extrudant from leaking between die attachment 10 and extruder barrel 12. The diameter of inlet passage 16 in the vicinity of the entrance of die attachment 10 is compatible with the diameter of the exit orifice of extruder 12 and then tapers to the desired diameter of inlet passage 16.

A cutting blade 70 is provided downstream of orifices 23 and is supported by a drive mechanism (not shown) which rotates blade 70 about axis 19 at a desired rotating speed. The flow rate of extrudant 24 and the rate of rotation of blade 70 may be controlled to cut ribbons 26 at desired axial distances so as to control the size of the cut pieces for later cooking.

Die plate 20 is secured to die housing 14 by means of cooperating threads located on the outer wall 21 of die plate 20 and the opposing surface within flange 15 of die housing 14. Die plate 20 of the present invention is generally circular and holds from 4 to 30 macaroni-type die orifices 23 placed in a spoke-like pattern around plate 20. As shown in FIGS. 4(a) and (b) different die orifice configurations can be used to achieve ribbons of various cross-sectional areas and shapes. Alternatively die orifices 23 can be spaced randomly on die plate 20, and essentially the entire orifice is inside an area having a radius less than the radius of base 32 of mandrel 30.

In operation, extrudant flow 24 is directed from extruder barrel 12 into inlet passage 16 where it is directed downwardly into flared section 18. As flow 24 advances into flared section 18, it encounters tip 46 of mandrel 30 and is diverted along the annular passage between the conic surfaces of mandrel 30 and the confronting wall of flared section 18. The flow 24 turns inwardly into the space provided between base 32 of mandrel 30 and the inner surface 25 of die plate 20 substantially filling the space. The extrudant is then formed into ribbons 26 as it passes through die orifices 23 in die plate 20. The orientation of mandrel 30 in flared section 18 may be adjusted by adjusting one or more of the four leveling screws 38. The axial distance between base 32 of the mandrel 30 and the inside surface 25 of the die plate 20 may be adjusted by moving all four leveling screws equal amounts to provide a wider or a narrower space between these surfaces. To provide a wider space, leveling screws 38 are tightened so that they project further into flared section 18 and since they abut against base 32 they cause mandrel 30 to move axially away from the inside surface 25 of base plate 20. If it is desired to reduce the space between base 32 and the inside surface 25 of die plate 20 leveling screws may be retracted out of flared section 18 away from base 32. This will allow stem 36 of mandrel 30 to recede into stem hole 42 and bushing 44 under its own weight and under the pressure of extrudant flow 24.

Leveling screws 38 may be also adjusted to create a non-parallel alignment between base 32 and the inside surface 25 of die plate 20 so as to provide a tilted or cocked mandrel. Tilting the mandrel affects the extrudant flow rate from each die orifice 23 to a greater or a lesser extent depending upon the direction and degree of tilt.

It is advantageous that the adjustment of the mandrel 30 can be achieved while the extrudant flow is operating. This permits the properties of the extruded ribbons to be controlled quickly and efficiently without interrupting the extruding process. By adjusting the orientation of the mandrel 30, it is possible to cause the ribbons to curve outward, to curve inward or, preferably, to flow in an essentially vertical direction. It is also possible by adjusting the tilt of the mandrel 30 to adjust the flow rate from each of die orifices 23.

The benefits obtained by the die attachment of the present invention are illustrated in the following description which is not limiting upon the invention.

The flow control device 10 of the present invention was attached to a single auger horizontal food extrudant equipped with a 1:2.6 compression auger. Die housing 14 had a 90° turn providing vertical extrudant flow from the die orifices 23. The particular die plate 20 which was used had four die orifices spaced equiangularly at a fixed radius from the center of die plate 20 like spokes of a wheel.

It was found that at a dough extrusion temperature of 170° F. an axial distance between base 32 of mandrel 30 and inside surface 25 of die plate 20 greater than 0.25 inch caused the ribbons 26 to curve outwardly; whereas, an axial distance of less than 0.20 inch caused the ribbons 26 to curve inwardly. Leveling screws 38 were adjusted during the operation of the extrusion process and it was found that the axial distance of the base 32 of the mandrel 30 above inside surface 25 of die plate 20 could be changed to straighten ribbon flow. It was also found that the mandrel 30 could be tilted and that the extrudant flow rate from each of die orifices 23 could be varied depending upon the direction and degree of tilt to facilitate substantially uniform flow rates from each of orifices 23.

The apparatus described in connection with FIGS. 2 and 3 is useful in carrying out the method of the present invention. The method of the present invention permits the simultaneous formation of a large number of ribbons 26 of extrudant 24, each ribbon 26 being formed at a substantially uniform flow rate. The method also permits each ribbon to be maintained in a vertically straight position.

Referring now to FIG. 5, there is shown an envelope of extrudant flow 24 developed during the practice of the present method. Generally, cylindrical extruded flow 100 having a relatively small diameter is directed under pressure in a downward direction along an axis 102. The extrudant flow is then diverted into an annular shell 104 flaring outwardly from axis 102 in the direction of the flow. The flow is then turned radially inward toward axis 102 thereby forming a generally cone-shaped extrudant envelope having a base 106 and a cone-shaped wall shell 108. The envelope is then discharged into a lower pressure area, e.g. the atmosphere, through a plurality of orifices (not shown) along base 106 of the cone envelope to form a corresponding plurality of downwardly extending ribbons 110. The thickness of base 106 may be adjusted to maintain the ribbons straight. The thickness of cone wall 108 may be adjusted to maintain the flow rate of each ribbon 110 substantially uniform.

It can be seen that the method of the present invention reduces the tendency of ribbons formed by the method of the prior art to curve either outwardly from axis 102 or inwardly toward axis 102 as the ribbons 26 flow from the extrudant cone envelope. In the present invention, it is possible to discharge the extrudant flow from the base 106 of the extrudant flow cone at various locations on the base of the envelope and still maintain the advantageous flow properties. Edible doughs or other plastic materials may be extruded according to the present invention.

While in the foregoing detailed description there has been described and shown the preferred embodiments of the method and apparatus of the present invention, various modifications will be apparent to those skilled in the art to which this invention relates without departing from the scope of this invention.

It is claimed:

1. An extruder head adapted for attachment to the exit end of a dough extruder for forming extruded material into a plurality of ribbons comprising:
   a housing having,
      an inlet passage adapted for fluid communication with said extruder for directing the extrudant in a downward vertical direction; and,
      a flared extrudant flow section in fluid communication with said inlet passage flared outwardly in the direction of the extrudant flow;
   die plate means spaced from said inlet passage and across said flared section of said housing;
   a plurality of orifices positioned in said die plate means for forming said extrudant into a plurality of ribbons;
   a generally cone-shaped mandrel supported in said housing with its base confronting and spaced-apart from said die plate means and having a base radius extending at least to the approximate outer edges of essentially all of said orifices, the confronting surfaces of said mandrel and said flared section of said housing being spaced-apart and defining an outwardly flared, annular flow channel therebetween for providing an extrudant flow path between said inlet passage and said orifices.

2. The extruder head of claim 1 further including means for adjusting the orientation of said mandrel in said flared section of said housing, thereby facilitating a substantially uniform flow rate from said orifices and for controlling the curvature of said ribbons.

3. The extruder head of claim 2 wherein the means for adjusting the orientation of said mandrel includes a plurality of adjusting elements supported by said die plate and operatively engaging said mandrel.

4. An extruder head adapted for attachment to the exit end of a dough extruder for forming extruded material into a plurality of ribbons comprising:
   a housing having,
      an inlet passage adapted for fluid communication with said extruder for directing the extrudant in a downward vertical direction; and, a flared extrudant flow section in fluid communication with said inlet passage flared outwardly in the direction of the extrudant flow;
   die plate means spaced from said inlet passage and across said flared section of said housing; a plurality of orifices positioned in said die plate means for forming said extrudant into a plurality of ribbons; a generally cone-shaped mandrel supported in said housing with its base confronting and spaced-apart from said die plate means and having a base radius extending at least to the approximate outer edges of essentially all of said orifices, the confronting surfaces of said mandrel and said flared section of said housing being spaced-apart and defining an outwardly flared, annular flow channel therebetween for providing an extrudant flow path between said inlet passage and said orifices, said generally cone-shaped mandrel includes an upper section having a first base angle and a base section having a second base angle greater than said first base angle so that the confronting surfaces of said mandrel and said flared section of said housing form a converging-diverging passage for said extrudant.

5. The extruder head of claim 4 wherein the axial extent of said mandrel upper section is substantially equal to the axial extent of the upper part of said mandrel base section.

6. The extruder head of claim 1 wherein said orifices include a generally rectangular cross-section.

7. The extruder head of claim 1 including orifices spaced randomly on said die plate means inside an area having a radius less than the base radius of said mandrel.

8. The extruder head of claim 1 wherein said orifices are formed by dies aligned flush with the surface of said die plate means confronting said mandrel cone base.

9. The extruder head of claim 2 wherein said means for adjusting the orientation of said mandrel includes:
at least three screws spaced about the center of said die plate and threadably supported thereby and extending therethrough and engaging the base of said mandrel;
an axial cavity extending from the upper surface of said die plate at the center of said die plate and extending partially through said die plate; and,
a stem affixed to and extending axially from said base of said mandrel adapted for insertion into said cavity for supporting said mandrel a minimum distance above the inner surface of said die plate.

10. An extruder head for substantially simultaneously forming extruded material into a plurality of ribbons comprising:
a housing having:
an inlet passage for directing the extrudant flow along an axis in a downward direction; and,
a flared extrudant flow section flared outwardly in the direction of extrudant flow and in fluid communication with and downstream of said inlet passage;
a plurality of constricted orifices positioned in a plane aligned generally perpendicular to said axis and in fluid communication with and downstream of said flared section for shaping said extrudant flow into a plurality of ribbons;
generally cone-shaped mandrel supported in said flow in said flared section of said housing having an upper portion directed into said extrudant flow and having a base of a sufficient diameter to overlie essentially all of said orifices thereby shaping the extrudant flow into a generally cone shaped shell configuration from the base of which said ribbons emanate through said orifices.

11. The extruder head of claim 10 further including means for adjusting the orientation of said mandrel with respect to said extrudant flow and said orifices to facilitate the equalization of flow delivered to each of said orifices and to permit the control of the curvature of the extruded ribbons.

12. A method of substantially simultaneously forming a flow of dough extrudant into a plurality of vertically-extending extrudant ribbons having a substantially uniform flow rate of extrudant for each ribbon comprising the steps of:
directing a flow of extrudant under pressure in a downward direction along an axis;
forming said extrudant flow into an annular shell flaring outwardly from said axis in the direction of said flow;
turning said flow radially inward toward said axis thereby forming a generally cone-shaped extrudant flow envelope; and,
discharging said flow to a reduced pressure area essentially only through a plurality of orifices within the vertical projection of the base of said cone-shaped flow envelope.

13. The method of claim 12 further including the step of adjusting the axial thickness of the flow in the base area to obtain a straight ribbon.

14. The method of claim 12 or 13 further including the step of adjusting the thickness of the flow in the conic surface area of the flow to obtain a substantially uniform flow from said orifices.

15. The extruder head of claims 1, 2, 4, 9, 10 or 11 wherein means is provided adjacent the exit side of said die plate means for cutting the extrudate into separate pieces.

16. The method of claim 12 or 13 wherein the extrudate is cut into separate pieces adjacent the exit side of said orifices.

17. A method of claim 12 or 13 wherein the side of said cone-shaped extrudant flow envelope beomes thinner and then thicker in the direction of flow.

* * * * *

UNITED STATES PATENT AND TRADEMARK OFFICE
CERTIFICATE OF CORRECTION

PATENT NO. : 4,290,989
DATED : September 22, 1981
INVENTOR(S) : Michael G. Topor et al.

It is certified that error appears in the above–identified patent and that said Letters Patent are hereby corrected as shown below:

Column 3, line 30, the number "20" (second occurrence) should be --40--.

Signed and Sealed this

Second Day of February 1982

[SEAL]

Attest:

Attesting Officer

GERALD J. MOSSINGHOFF

Commissioner of Patents and Trademarks